Feb. 22, 1966    J. A. R. G. GRIGNET    3,237,098
METHODS AND APPARATUS FOR CAPACITIVELY MEASURING
PARAMETERS OF THE LENGTH DISTRIBUTION
OF TEXTILE FIBRES IN A SAMPLE
Filed Dec. 29, 1959    7 Sheets-Sheet 1
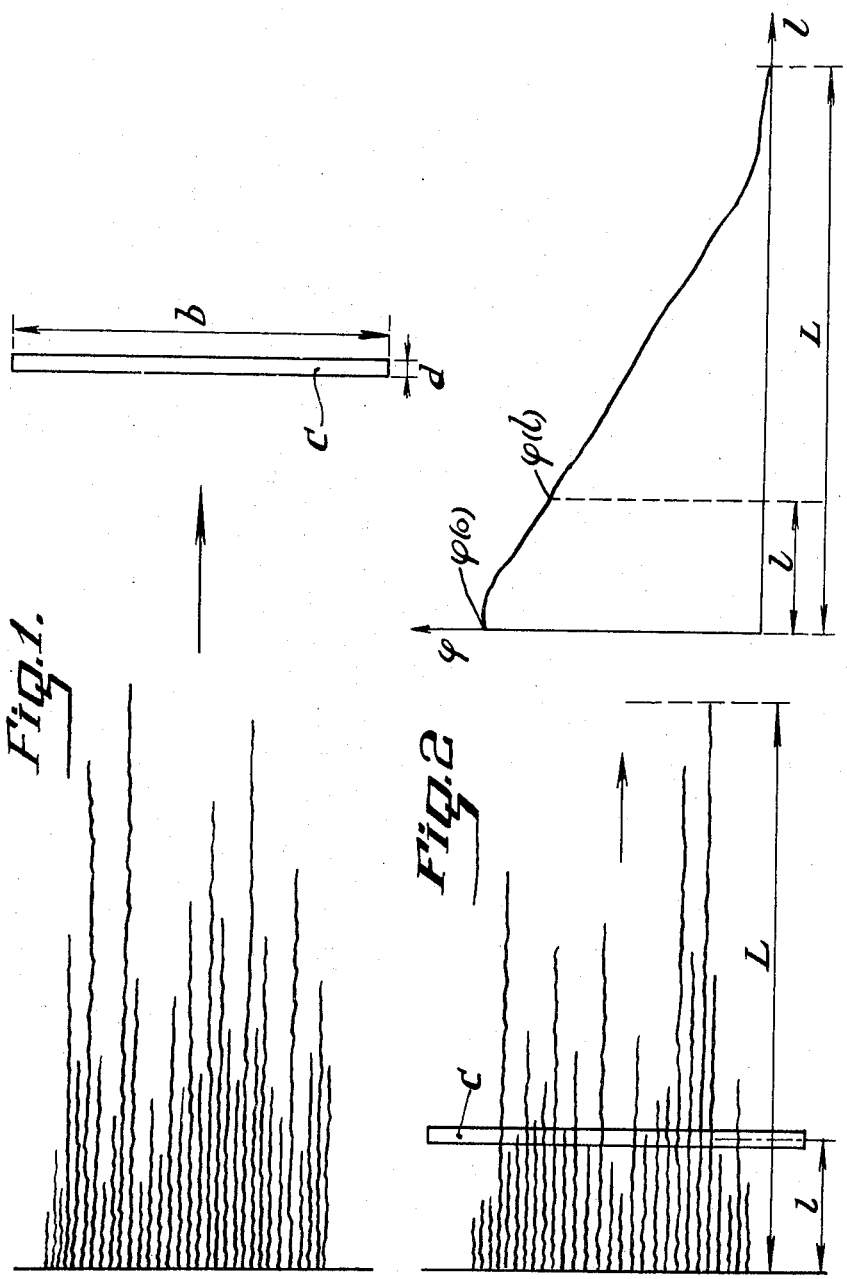
INVENTOR:
JOSEPH ALPHONSE RENÉ GHISLAIN GRIGNET
BY
Richardson, David and Verdon
ATTY'S.

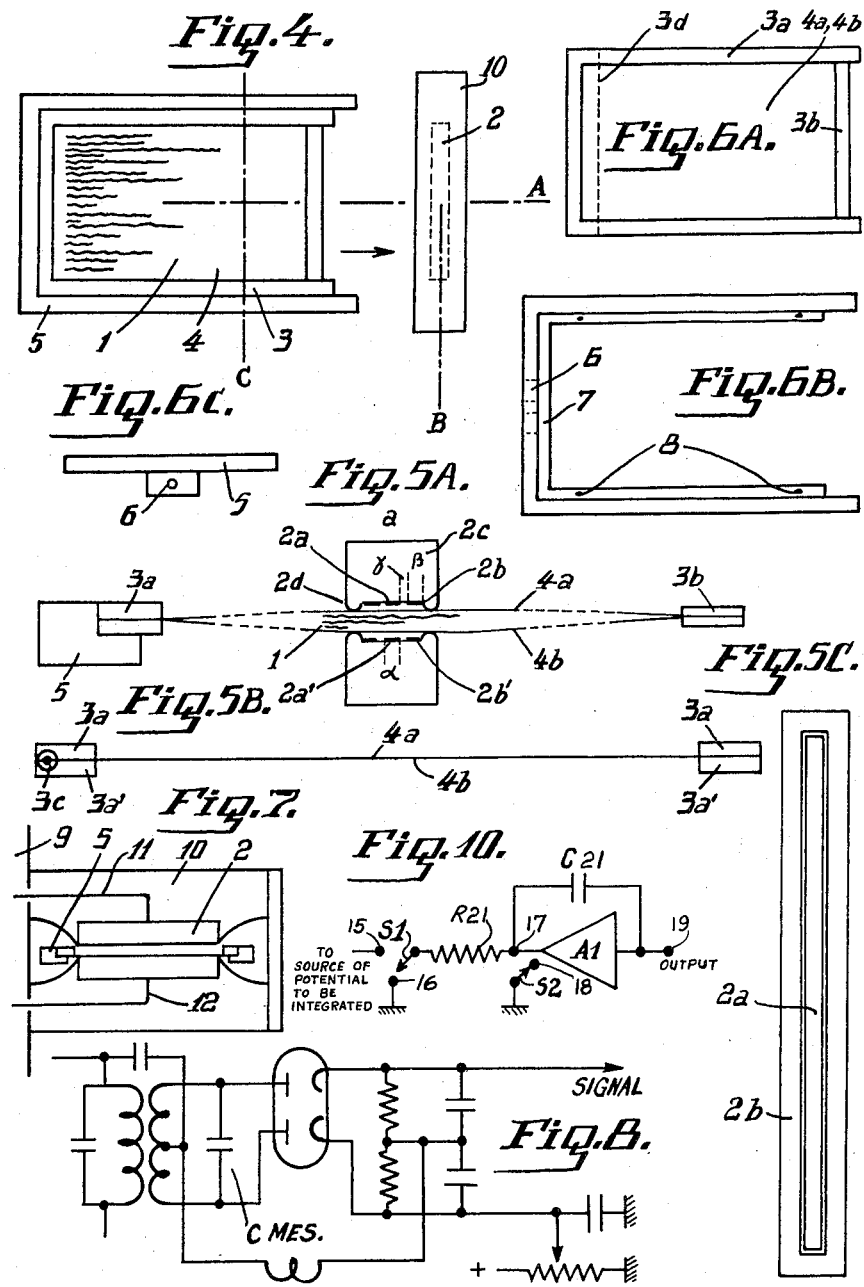

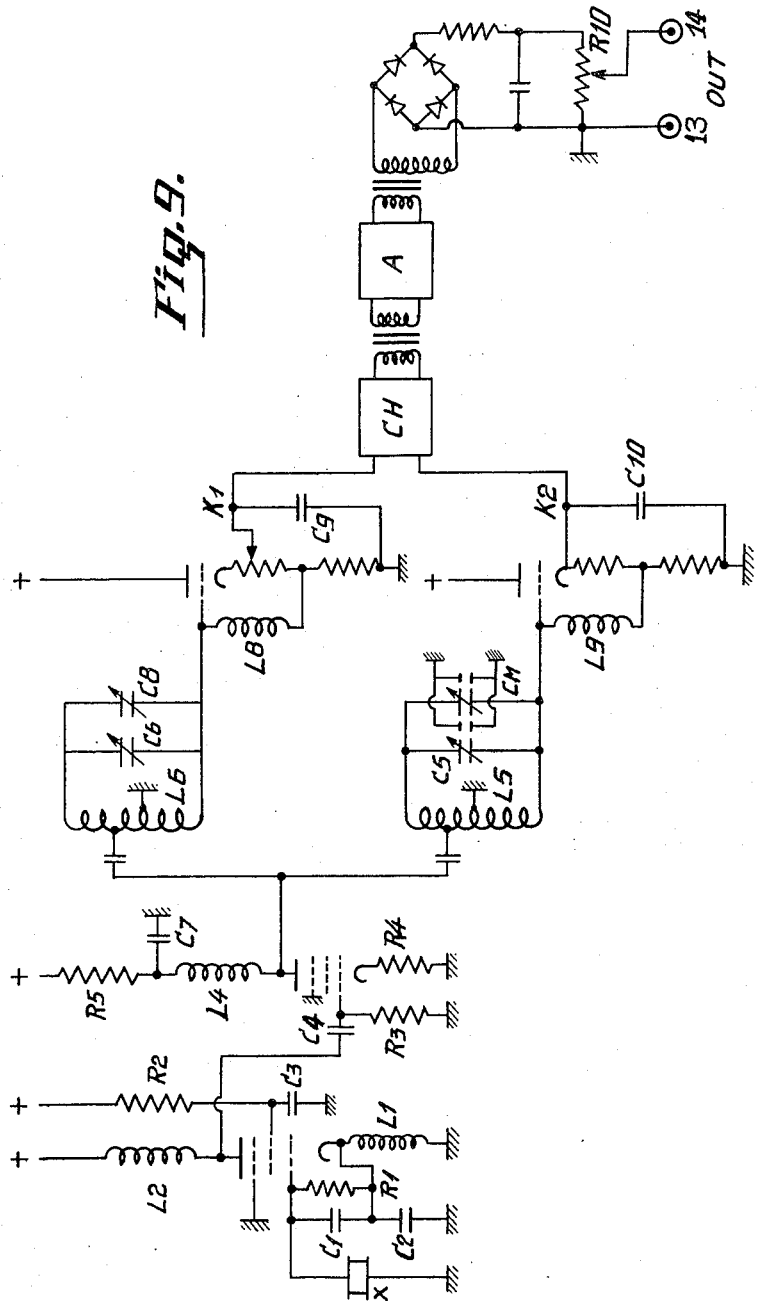

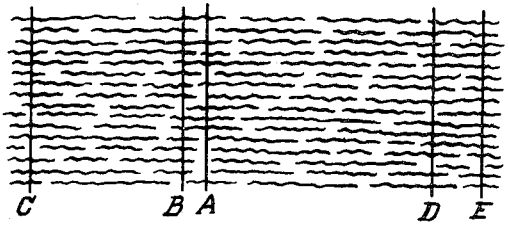
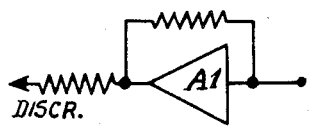
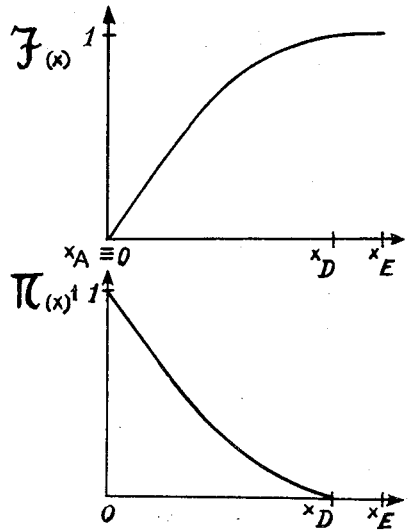
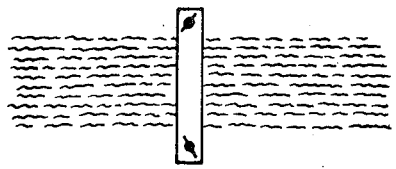
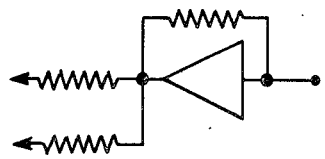

Feb. 22, 1966   J. A. R. G. GRIGNET   3,237,098
METHODS AND APPARATUS FOR CAPACITIVELY MEASURING
PARAMETERS OF THE LENGTH DISTRIBUTION
OF TEXTILE FIBRES IN A SAMPLE
Filed Dec. 29, 1959   7 Sheets-Sheet 6

INVENTOR:
JOSEPH ALPHONSE RENE GHISLAIN GRIGNET
By
Richardson, David and Verdon
ATTY'S Feb. 22, 1966    J. A. R. G. GRIGNET    3,237,098
METHODS AND APPARATUS FOR CAPACITIVELY MEASURING
PARAMETERS OF THE LENGTH DISTRIBUTION
OF TEXTILE FIBRES IN A SAMPLE
Filed Dec. 29, 1959    7 Sheets-Sheet 7

INVENTOR:
JOSEPH A. R. G. GRIGNET

BY Richardson, David & Nordon
ATTORNEYS.

United States Patent Office 3,237,098
Patented Feb. 22, 1966

3,237,098
METHODS AND APPARATUS FOR CAPACITIVELY MEASURING PARAMETERS OF THE LENGTH DISTRIBUTION OF TEXTILE FIBRES IN A SAMPLE
Joseph Alphonse René Ghislain Grignet, Verviers, Belgium, assignor to Centre Scientifique et Technique de l'Industrie Textile Belge, Association sans But Lucratif, Brussels, Belgium
Filed Dec. 29, 1959, Ser. No. 862,687
Claims priority, application Belgium, Dec. 31, 1958, 574,364; Sept. 12, 1959, 582,633
15 Claims. (Cl. 324—61)

The present invention relates to methods and apparatus for measuring parameters with respect to thickness and length distribution of wool fibers.

*(1) General remarks—Purpose and advantage of the apparatus*

In the woollen industry combed sliver is a very important semi-finished product. The value of the sliver depends principally on two parameters: the fineness (mean diameter of the fibres) and the length (mean length of fibres).

Heretofore, owing to lack of suitable apparatus, most woollen goods manufacturers estimated these two parameters empirically by sight and feel. The existing apparatus; projection type microscope for measurement of the diameter and comb-type analyser for evaluation of the length, are in fact too expensive, too bulky and of unduly delicate operation. Only a specially trained laboratory assistant can correctly use such apparatus. Finally, their main disadvantage lies in the very long time devoted to a measurement: of the order of 40 minutes, including calculations, to obtain the mean length with a comb-type analyser.

In addition to the woollen goods manufacturer, the spinning mill director must also know the fineness and the length distribution within the batch of sliver in order correctly to choose the type of yarn he can spin and to work out a production plan accordingly. Hitherto, however, only large firms have been able to afford the apparatus required.

The need for inexpensive measuring instruments, simple in operation, and requiring no special knowledge or training on the part of the operator for effecting the measurement in a sufficiently short time is clearly apparent from the foregoing considerations and the object of the invention is to provide such an apparatus.

*(2) The different expressions of the length mean. Items of information required by the user, with their order of importance*

(2.1) The length mean may be given in various ways. It is possible to use the arithmetic length mean; or the mean proportionate to the section of the fibres, which is denoted by the term "height" (length biased mean length); or else the mean proportionate both to the section and to the length of the fibres, which is hereinafter denoted by the term "beard" (length and area biased mean length, or weight biased mean length).

A survey of woollen goods manufacturers has shown that the determination of these latter concerned the "beard" more especially. The organisations which are equipped for the measurement of the length have therefore chosen to express the mean by the value closest to the empirical determination of the woollen goods manufacturers. Thus the expression of the mean length defined as the "beard" (i.e. proportionate to the section and to the length) has become generally accepted in the industry.

It is also apparent that this form of mean is the most important from the point of view of the spinning mill operator.

(2.2) A survey of factory owners and experts in the woollen industry and spinning mill technicians, combined with long experience of measurement of the length in the laboratory and of the subsequent practical use of the results, has enabled the various items of information regarding the length of the fibres to be classified in order of importance.

The user wishes to know:

(1) The mean length of the fibres, preferably the mean length proportionate to the section and to the length, i.e. the "beard."

(2) A numerical measurement, characterising the length dispersion; preferably the coefficient of variation (C.V.) of the length.

(3) The proportions (numerically generally) of the fibres whose length is greater than 4 or 5 units of predetermined length. This latter item of statistical information sufficiently characterises the form of the length distribution.

The proportions thus defined constitute in fact points which are determinative of the distribution function (cumulative distribution) of the length of the fibres, better known by woollen goods manufacturers under the name "Fibres length diagram."

For industrial use, it is quite unnecessary to establish the fibres diagram completely. An indication in figures of the mean and of the dispersion (coefficient of variation) associated with a knowledge of the approximate form of the diagram (4 or 5 points furnished by the proportions mentioned hereinbefore) constitute in fact items of information which are more than sufficient and which are also much superior to simply a knowledge of the diagram.

The apparatus forming the subject of the invention has been designed to satisfy these practical requirements of the user, while providing rapidity, ease of operation and low cost price as set forth hereinbefore.

The most important item of information, the mean length weighted in accordance with cross-sectional area, is furnished by direct indication on a dial. The numerical measurement of the dispersion (in the form of $CV^2$) is obtained simply by subtraction and division from the indication of a second dial. Finally, the fractional ratio or proportion of the fibres whose length is greater than 4 or 5 times the chosen length level or unit length are also indicated directly on a dial.

This arrangement offers the following advantages:

(1) Rapidity and reliability in measurement: as soon as the sample of sliver has passed through the apparatus (i.e. after one minute) all the required items of information are registered on dials. This complete automation eliminates to the maximum degree any risk of error on the operator's part.

(2) Relatively low cost price: the electronic calculator used, which is very simple, normally contains only 3 tubes; it give the principal items of information, mean and CV. A very simple memory device (condensers) furnishes the proportions of fibres whose length exceeds the levels chosen.

The invention will be better understood from the following description with reference to the accompanying drawing.

Referring to the drawing:

FIGURE 1 is a plan diagrammatic view showing the arrangement of the fibres of a test prior to the beginning of a test.

FIGURE 2 is a plan view similar to FIG. 1 showing the sample during an intermediate stage of the test, and a graph which shows the capacitance.

FIGURE 2A is a graph which shows the capacitance readings of the sample plotted against distance from the base line of the sample.

FIGURE 4 is a plan view of the movable frame which holds the test sample and the measuring capacitor.

FIGURE 5A is a sectional view in elevation taken along the line A of FIG. 4.

FIGURE 5B is a sectional view in elevation of the movable frame taken along the line C of FIG. 4.

FIGURE 5C is a plan view of one of the measuring electrodes and the rectangular guard electrode which surrounds the measuring electrode.

FIGURE 6A is a plan view of the frame removed from the U-shaped movable carrier chassis, showing the common base line for the fibres.

FIGURE 6B is a plan view of the carrier chassis with the frame removed.

FIGURE 6C is an end view showing the screw and nut system for displacing the carrier frame.

FIGURE 7 is an end view showing the carrier chassis, the frame and the measuring capacitor.

FIGURE 8 is a circuit diagram illustrating a discriminator circuit in which the measuring capacitor shifts the tuning.

FIGURE 9 is a circuit diagram showing a stabilized form of measuring circuit.

FIGURE 10 is a circuit diagram showing an integrating circuit.

FIGURE 11 shows the integrator of FIG. 10 with the integrating capacitor replaced by a resistor for calibration purposes.

FIGURE 12 shows a group of fibres from which a sample is to be extracted.

FIGURE 13 shows two graphs representing measurements obtained with a sample obtained from the fibres of FIG. 12.

FIGURE 14 shows a group of fibres clamped for combing.

FIGURE 15 is a circuit diagram showing an amplifier with feedback connected to resistors to form a voltage adding circuit.

Figure 3:
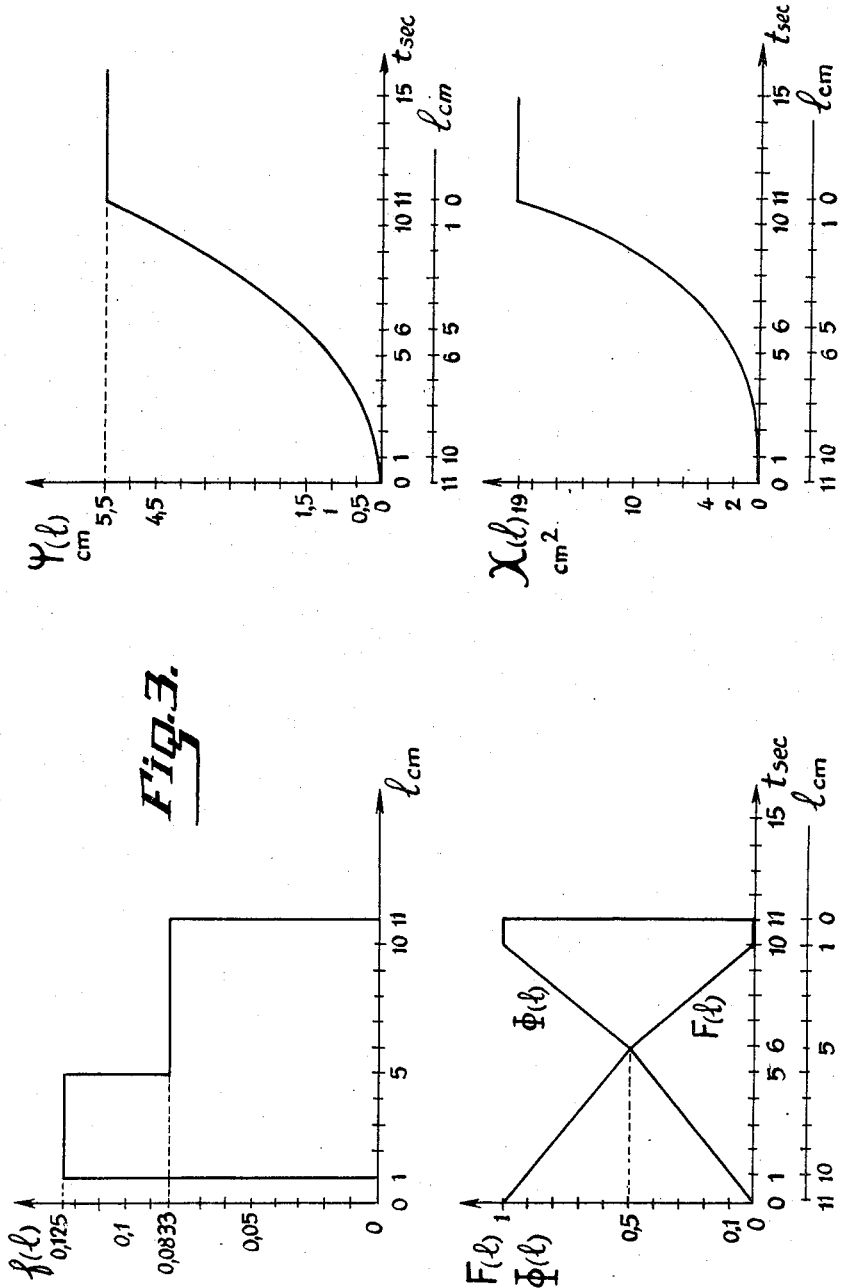
FIGURE 3 shows four graphs representing various properties of the sample, all plotted with reference to distance from the base line, a time scale being shown for displacement of the sample through the measurement zone at constant speed.

(3) *Principle of the apparatus—1st method of measurement—Theoretical justification*

For a correct definition of the length means (height and "beard" factor), and a description of the various notations used, see the article by F. Monfort: "The Schlumberger Analyser," published in the Belgian journal "Textilis," Ghent, September 1957. This article also gives a complete bibliography of the question of length measurement.

Use will be made of the notations of means used by R. C. Palmer, which comprises parentheses containing two terms separated by a comma: The first indicates the weight factor of the mean (i.e. the quantity to which it is proportionate): the second indicates the characteristic to which the mean measured relates.

Thus, if we put $a$=cross-sectional area and $l$=length of the fibre, the notation $[a, l]$ means: means length proportionate to the section.

Similarly, $[1, l]$ designates the numerical means length (weight factor 1), and $[al, l]$ the mean length proportionate to the section and to the length.

The length apparatus described in this patent may be used according to two methods characterised by different sampling, the equipment required for the measurement being identical in both cases.

The principle of operation of the apparatus in the 1st method of measurement may be described in 3 stages:

(3.1) *Taking of the sample.*—From the combed sliver to be checked (or any other material in which the fibres are substantially parallel), are taken the fibres the ends of which are distributed in a small transverse zone of the sliver, this zone being about 4 mm. in width. In this way a representative sample is obtained.

This sampling may be effected by hand fairly easily by means of tweezers with wide edges. It may also be effected by means of a device employing automatic tweezers, similar to that used in the comb analyser feed apparatus.

The sample takes the form of a sheet of parallel fibres, all these fibres having their ends on the left aligned on a common base line perpendicular to the general direction of the fibres (see FIG. 1).

(3.2) *Actual measurements.*—The sample thus obtained is driven at constant speed in the direction of the arrow and passes through a measuring device providing an electrostatic field in a zone C of a length $b$ greater than the width of the sheet of fibres and of a width $d$ which is sufficiently small in relation to the mean length of the fibres to be effectively equal to zero (see FIG. 1). This device measures the total mass of fibrous material present within, i.e. below the surface $bd$. By recording the electric voltage $\varphi(l)$ furnished by this device, a diagram is obtained which characterises the length distribution of the fibres in the sample (see FIG. 2). Taking as origin of the abscissae $l$, the common base line of alignment of the fibre ends or heads, and considering the fibres as perfect cylinders of identical cross-section $a$, it is in fact found that the voltage $\varphi(l)$ for a given length $l$ is proportional to the number $n_1$ of fibres whose length is equal to or greater than $l$.

$$\varphi(l) = n_1 a d \delta \quad (1)$$

where $\delta$ is the specific gravity.

If $\varphi(o)$ is used to denote the voltage corresponding to the base line of the fibres, then for $l=0$ we have:

$$\varphi(0) = n_o a d \delta \quad (2)$$

where $n_o$ is the total number of fibres in the sample.

By relating $\varphi(l)$ to $\varphi(o)$ it will be seen that we obtain, for each length $l$, the proportion $n_1/n_o$ of fibres whose length is equal to or greater than $l$:

$$\frac{\varphi(l)}{\varphi(o)} = \frac{n_1}{n_o} \quad (3)$$

If we use the symbol $\Phi(l)$ for the ratio $\varphi(l)/\varphi(o)$ and the symbol $F(l)$ for the distribution function (or cumulative distribution), defined by:

$$F(l) = \text{Probability [length of a fibre} \leq l] \quad (4)$$

we have directly the equality:

$$\Phi(l) = 1 - F(l) \quad (5)$$

In reality however the fibres are not cylinders of identical cross-section. In the voltage furnished by the measuring device each fibre produces a measurement effect which is proportional to its section. Since moreover $d$ and $\delta$ remain constant, we obtain in fact a diagram $\Phi(l)$ corresponding not to a numerical distribution of the fibres, but to a distribution proportionate to the total cross-sectional area of the fibres within the zone C: i.e., a "height" diagram for the fibres.

In order to distinguish this property of the measuring device, the voltage furnished by the device in relation to this same voltage for $l=o$ will be termed $\Phi_a(l)$ instead of $\Phi(l)$.

(3.3) *Calculation of height* $[a, l]$ *and of the beard* $[a, l]$.—From the voltage $\Phi_a(l)$ delivered by the measuring device it is possible to calculate $[a, l]$ and $[al, l]$ in several ways, using the various relationships involving the differently biased means weights. The best known relationships make use of the squares of coefficients of variation, of the products and other factors. Now it is well known that in electronic analog computations, the operations of squaring, multiplication, and division are very difficult and very expensive to produce; the simplest operation is integration.

The attempt has therefore been made to use solely integration operations. The calculator comprises two successive integrators. The first is fed with the voltage $\Phi_a(l)$ of the measuring device. The second is fed continuously during the measurement with the output voltage of the first integrator.

The sample must pass through the measuring device in the direction indicated by the arrow in FIG. 1.

When, at the end of the measurement, the base line passes through the zone C, the integrators pass automatically into the position "Hold" or "Reading."

In these conditions, the output voltage of the first integrator represents the height $[a, l]$ and that of the second integrator the quantity ½ $[a, l]$.

The "beard" is easily deduced from this simply by division, using the relationship:

$$\text{Beard} = [al, l] = \frac{[a, l^2[}{[a, l]} \quad (6)$$

Finally, the variation coefficient of the height is obtained by using the relationship:

$$[al, l] = [a, l][1 + cv^2_{a, 1}] \quad (7)$$

The theoretical justification of these integration operations is as follows:

If we use the term $F(l)$ for the length distribution function of the fibres, in numerical distribution, and L for the maximum length corresponding to the longest fibre, we have the following for the first integration:

$$\int_0^L \Phi(l)\,dl = \int_0^L [1 - F(l)]\,dl = \{l[1 - F(l)]\Big|_0^L +$$

$$\int_0^L l\,dF(l) \} = [1, l]$$

hence:

$$\int_0^L \Phi(l)\,dl = [1, l] \quad (8)$$

For the second integration:

$$\int_0^L \Phi(l)\,dl \int_0^L dx = \int_0^L l[1 - F(x)]\,dl = \left\{ \frac{l^2}{2}[1 - F(l)]\Big|_0^L + \right.$$

$$\left. \int_0^L \frac{l^2}{2} dF(l) \right\} = \frac{1}{2}(1, l^2) \quad (9)$$

In reality, the voltage of the measuring device does not correspond to a numerical distribution, of weight factor 1, but to a distribution proportionate to the total fibre cross-section of weight factor $a$.

The properties of the evaluated mean weight permit immediate deduction of the following formulae, by replacing the weight factor 1 by $a$ in Formulae 8 and 9:

1st integration:

$$\int_0^L \Phi_a(l)\,dl = [a, l] \quad (10)$$

Second integration:

$$\int_0^L \Phi_a(l)\,dl \int_0^1 dx = \frac{1}{2}[a, l^2] \quad (11)$$

FIGURE 3 gives a numerical example of this process of obtaining mean length by double integration.

The length distribution in the sample is represented by $f(l)$ (density function).

Therefore $$\int_{-\infty}^{+\infty} f(l)\,a'l = 1$$

$F(l)$ represents the distribution function (cumulative distribution). $\Phi(l)$ corresponds to the voltage delivered by the measuring device; as has already been shown $$\Phi(l) = 1 - F(l)$$

$\psi(l)$ is the output voltage of the first integrator; fed continuously during the test by the voltage $\Phi(l)$ of the measuring device; this first integrator furnishes at the end of the test the voltage:

$$\psi(L) = \int_0^L \Phi(l)\,dl \equiv [1, l]$$

The output voltage $\psi(l)$ of the first integrator being fed continuously during the test to the input of the second integrator, the latter furnishes an output voltage $X(l)$ the final value $X(L)$ of which represents:

$$\int_0^L \Phi(l)\,dl \int_0^1 dx \equiv \frac{1}{2}[1, l^2]$$

In the numerical example given in FIG. 3, the mean length $[1, l]$ is equal to 5.5 cm. and ½ $[1, l^2]$ is equal to 19.33 sq. cm. These values may be easily checked by the usual calculation from the distribution $f(l)$.

The example in FIG. 3 is based on a numerical distribution (weight factor 1). By using the section $a$, similar results would be obtained, $\Phi(l)$ being replaced by $\Phi_a(l)$ and the weight factor 1 by the weight factor $a$ in the expressions $[1, l]$ and ½ $[1, l^2]$.

The speed of displacement of the sample through the test zone C is 0.33 cm. per second.

(4) *Construction of the apparatus*

Figure 20:
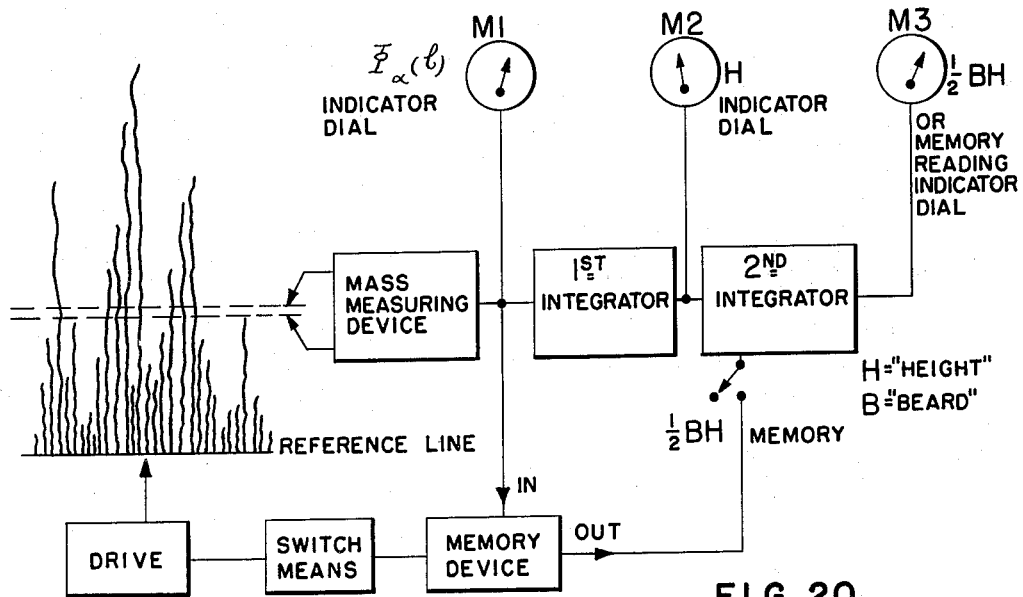
FIGURE 20 is a block diagram showing the interconnections among the various component circuits.

The equipment required for the measurement comprises three basic components arranged as shown in the block diagram of FIG. 20. These components are:

(1) The measuring device for the local mass: constituted at present by a measuring condenser associated with the electronic apparatus (microcapacimeter) furnishing an electrical voltage proportional to the mass of fibres, present in the condenser.

(2) The analog computer (determining the mean and the CV), constituted at the present time by two electronic integrators.

(3) The device furnishing the proportions of fibres whose length is greater than some levels chosen: at present constituted by memory condensers or a mechanical system.

(4.1) *Mechanical part of the measuring device.*—The mass measuring device (producing zone C in FIGURE 1) is at present constituted by a condenser is conventional.

The system for the drive of the sample at constant speed through the condenser is constituted as follows (see FIGURE 4):

The sample of fibres is placed in a detachable frame 3 of duralumin; it is clamped there between two thin sheets 4 of Teflon under tension. This frame containing the sample is disposed in grooves provided on a rigid-chassis 5 in the form of a U, which is practically indeformable.

This U-shaped chassis 5, which is slidably mounted in the apparatus, serves for rectilinearly displacing the sample at constant speed through the test zone C. This constant speed movement is provided by a screw and nut system 6 (FIG. 6C), the screw being driven by a synchronous motor (not shown).

Each of the three components, referred to above, will now be described in greater detail.

FIGURE 5A is a sectional view of the vertical plane passing through the dot-dash line A of FIGURE 4. The special construction of the condenser will be seen there.

The essential features of this condenser are as follows: (see FIGURES 5A and 5C).

(1) It is formed by two elongated rectangular electrodes $2a$ and $2a'$ of a width (3 mm. in our example) which is negligible in relation to the mean length of the fibres, and of a length (100 mm. in our example) greater than the width of the sheet of fibres.

(2) These electrodes $2a$ and $2a'$ are surrounded by rectangular guard rings $2b$ and $2b'$.

(3) The potentials of the electrodes $2a$ and $2a'$ are symmetrical with respect to the common potential of the rings $2b$ and $2b'$. Generally, the rings $2b$ and $2b'$ are grounded and the electrodes $2a$ and $2a'$ are respectively at potentials $+V$ and $-V$.

(4) The electrodes must be thin (whereby parasitic capacities are reduced to a minimum).

In our example, the condenser comprises a rigid block $2c$ of insulating material (for example Teflon, polystyrene, silicone-treated glass, or the like). The dimensions of this insulating rectangular parallelepiped are approximately 125 x 18 x 12 mm.

On this insulating support electrodes are formed by coating the surface of the insulating material with a light metal deposit (silver or gold); this deposit is made by evaporation in vacuo, painting or metallisation by jet under pressure.

The dimensions $\alpha$, $\beta$, $\gamma$ in FIG. 5A advantageously are respectively: $\alpha=3$ mm.; $\beta=3$ mm., $\gamma=1.5$ mm. The distance $\delta$ between electrodes is 6 mm.; however, the linearity of the capacity variation in dependency on the variation of the mass is suitable only if the thickness of the sample of fibres does not exceed 4 mm. at the centre of the condenser. The centering and compression of the sample of fibres are effected by the two sheets of Teflon under tension $4a$ and $4b$, between which it is clamped; moreover, rounded guide projections $2d$ are provided to prevent the sample from closely approaching the electrodes.

The detachable frame 3 is shown in FIGURE 5A in section on the dot-dash line A in FIGURE 4. FIGURE 5B shows the frame 3 in section taken on a vertical plane passing through the dot-dash line C in FIGURE 4 and FIGURE 6A is a plan view.

This frame 3 comprises two parallel arms $3a$ forming the sides of a U of duralumin of a thickness of 3 mm., which can pivot about a lateral hinge $3c$ shown in FIG. 5B. The fourth side $3b$ of the frame is the only one which has to pass between the electrodes $2a$ and $2a'$ of the measuring condenser ($\delta=6$ mm.); and, accordingly, it is made with two plates of thinner duralumin, of a thickness of 1.5 mm. Two sheets of Teflon $4a$ and $4b$ of 0.03 mm. are glued and attached under tension to the four sides of the frame. The tension is about 2 to 3 kg.; the sheets of Teflon are in direct contact with each other when the frame is closed. The insertion of the sample in the frame further slightly increases the tension.

As a result of the compression of the sample of fibres by the sheets of Teflon, a sample containing a much higher population of fibres may be passed through the condenser, thus increasing the precision of the measurement, reducing the sensitivity requirements of the electronic part and thus enabling the stability to be greatly increased.

A plurality of interchangeable frames may be used to prepare samples.

A reference mark $3d$ is drawn on the Teflon and the edges of the frame to indicate the point where the common base line of alignment of the fibre ends is to be situated (or alternatively the line of the squared end of the piece of prepared sliver, in the second method of measurement described hereinafter).

FIGURES 6B and 6C represent the U-shaped chassis;

6 is the screw and nut system serving for the drive, 7 a ledge which is adapted to receive the detachable frame, which is held in place by small lugs 8. FIGURE 7 shows (in section through a vertical plane passing through the dot-dash line B in FIGURE 4) the installation of the measuring condenser on the chassis 9 carrying the electronic section. A very rigid part 10 of cast aluminum serves to fix the measuring condenser on the chassis 9 so that it will be positively stationary; this part, surrounding the condenser, also acts as a shield; 11 and 12 are conductors extending to the electronic part from the electrodes $2a$ and $2a'$.

In the construction of the frame, Teflon was chosen for its low dielectric constant $\epsilon=2$ and for its favourable mechanical properties. Owing to this low value of $\epsilon$, the sheets of Teflon introduce a minimum parasitic capacity by their passage through the condenser. Moreover, they can be obtained with a very uniform thickness.

The passage of the sample of fibres through the condenser, by changing the dielectric constant in the field between the plates, produces a capacity variation $\Delta C$, proportional to the increment caused by the presence of the fibrous mass in the condenser. It is only necessary to convert this capacity variation into an electrical voltage variation: that is the function of the electronic part of the measuring device, which is described in 4.2.

(4.2) *Electronic part of the measuring device.*—This part of the apparatus has been designed to satisfy reasonable requirements in respect of stability and precision, while maintaining a minimum cost.

The electronic part is in fact a "microcapacimeter," that is to say an apparatus which permits the conversion of very small capacity variations into electrical voltage variations. Three circuits have been tried out for this microcapacimeter:

*1st circuit.*—(Conventional—not shown): The measuring condenser is connected to the terminals of the tuned circuit of a high-frequency oscillator. The frequency variations produced are converted into amplitude variations by a discriminator, of the Foster-Seeley type, for example, after passing through a limiter.

*2nd circuit.*—The measuring condenser $C_{MES}$ is connected in parallel to the secondary of the transformer of a discriminator, of the Foster-Seeley type for example (see FIGURE 8).

The primary of the discriminator is fed at fixed frequency by a crystal oscillator, followed by a "buffer" stage if required.

*3rd circuit.*—The measuring condenser $C_M$ is connected in parallel with a tuned circuit L5C5 (see FIGURE 9). This circuit is fed at high frequency (21 mc./s. for example) by a crystal oscillator, followed by a buffer stage if required. The anode of the tube feeding the tuned circuit with H.F. is coupled to the latter by a condenser (FIGURE 9). (It would also be possible to use a magnetic coupling.)

A second circuit L6C6 absolutely identical in construction to the first, is coupled in the same way to the plate of the high-frequency amplifier tube. The adjustable capacitor C8 matches the measuring capacitor $C_M$.

The two resonant circuits L5C5 and L6C6 are tuned to the same frequency of resonance which is slightly offset from the frequency of the crystal (or a multiplied higher frequency). The frequency offset is chosen to use a suitably linear part of the flank of the resonance curve.

The H.F. voltage of the terminals of each of the tuned circuits is detected by a triode (for example 6201) connected as a detector with an infinite input impedance (Sylvania detection), in order not to damp the measuring circuit.

The measuring voltage $\Phi_a(l)$ is the difference between the voltages of the two cathodes K1 and K2.

This voltage is modulated by a diode modulator, amplified by two triodes in cascade for example and detected by a diode bridge.

In this way a fairly low output impedance is obtained.

The potentiometer R10 constitutes a gain control; it permits adjustment of the maximum output voltage to the specified value (scale reading 100 of the voltmeter).

The condenser C8, in parallel with capacitor C6, provides for readjustment or recalibration of the zero before each measurement.

The voltage $\Phi_a(l)$ is available at the terminals 13 and 14 designated "OUT" (FIGURE 9).

This circuit has a very good stability, all the variable factors such as changes in temperature or frequency drift of the oscillator produce identical effects in both tuned circuits and thus do not disturb the output measurement signal the magnitude of which is determined by the difference between the outputs of the two tuned circuits.

(4.3) *The electronic computer.*—The computer receives the measuring voltage $\Phi_a(l)$ and deduces therefrom the means height $[a, l]$ and the moment of the second order $\frac{1}{2}[a, l^2]$, enabling the "beard" factor and the coefficient of variation (C.V.) of "height" to be immediately obtained.

It comprises two successive integrators with "parallel feedback." This term denotes an integrator, as shown in FIG. 10, composed of a D.C. amplifier A1, the output terminal 19 of which is connected to the input terminal 17 by an integrating capacitor C21, the input terminal being connected to the source of voltage to be integrated by a resistance R21.

The contacts S1 and S2 are relay contacts controlling the periods of operation of the integrator.

These three operating periods are as follows:

*Reset.*—This operation is a return to zero after each measurement. S2 switches from terminal 18 to 17 grounding the input of amplifier A1. S1 moves from terminal 16 to 15.

*Compute.*—This is the actual period of measurement during which the sample passes at constant velocity between the electrodes 2a and 2a' of the measurement capacitor. S2 is moved to terminal 18 and S1 is moved to terminal 15 so that the source of voltage which is to be integrated is connected through resistor R21 to the input terminal of amplifier A1. For the first integrator the voltage source is the output terminal 14 of FIG. 9. For the second integrator the voltage source is the output terminal 19 of the first integrator.

*Hold.*—This is the period after termination of the Compute period. S2 is on terminal 18 and S1 is connected to terminal 16 grounding the resistor R21. The indicating voltmeters M2 and M3 are connected to the output terminals 19 of the first and second integrators, respectively.

A number of types of D.C. amplifiers are suitable for the integrator circuit.

(1) A D.C. amplifier with direct connection between stages.

Figure 17:
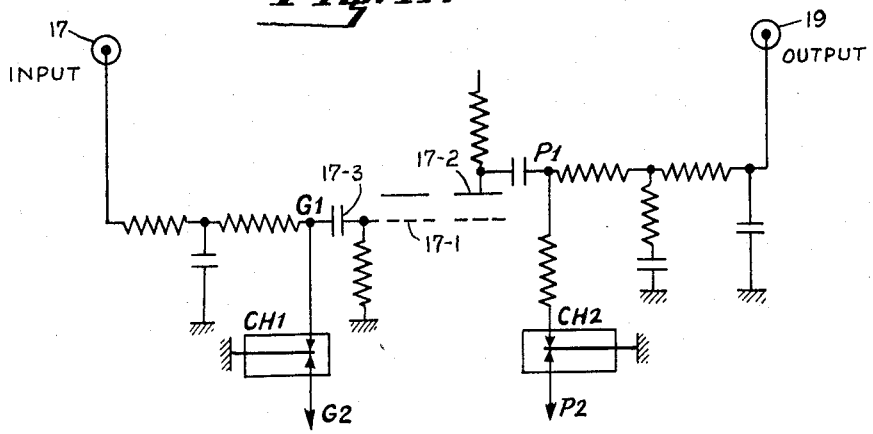
FIGURE 17 is a circuit diagram of an amplifier of the carrier current type with modulation and demodulation provided by electromechanical choppers.

(2) An amplifier of the carrier current type, with modulation and demodulation by electromechanical chopper, with a carrier of 100 cycles or 400 cycles (FIGURE 17).

Figure 18:
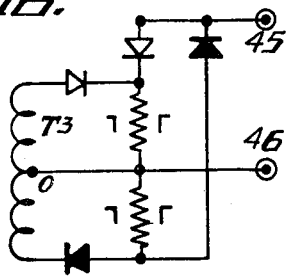
FIGURE 18 is a circuit diagram of an amplifier of the carrier current type with modulation and demodulation provided by diode choppers.

(3) An amplifier of the carrier current type, with modulation and demodulation by a diode chopper (FIGURE 18).

(4) An amplifier of the carrier current type, with modulation and demodulation by means of a transistorised chopper.

The direct-connection amplifier is very economical; however it requires supplementary adjustment to compensate for the zero drift.

The three other types of amplifier are applicable without major drawback. The electromechanical chopper has been chosen (see FIGURE 17).

Referring to FIG. 17, the amplifier consists of three resistance-coupled triode stages of which only the grid 17-1 of the first tube and the plate 17-2 of the last tube are shown in the drawing. The three tubes are preferably twin triodes such as types 12AX75, 5751 and 6201 for the first, second and third stages, respectively. One of the triodes in each tube forms a part of the first integrator, the other triode in each tube forming a part of the second integrator. The input chopper CH1 alternately grounds the terminal G1 of the first integrator and the corresponding terminal G2 of the second integrator. The output chopper CH2 operates in a similar manner with respect to the terminals P1 and P2 of the first and second integrators, respectively. The input chopper CH1 converts the D.C. input voltage received at terminal 17 to an interrupted voltage the A.C. component of which passes through the input coupling capacitor 17-3 and is amplified by the three-stage amplifier. The output chopper CH2 operates in synchronism with the input chopper CH1 to demodulate or rectify the amplified A.C. component. Since the amplitude of the A.C. input component is proportional to the amplitude of the D.C. input signal on terminal 17, the rectified D.C. output signal at terminal 19 is proportional to the D.C. input signal. The linearity of resistance-coupled amplifier stages is well known.

(4.4) *Device furnishing the proportion of fibers whose length is greater than some fixed levels*

(4.41) *Purely mechanical device.*—In the first method of measurement, the voltage $\Phi_a(l)$ which appears at the terminals 13 and 14, "OUT" (FIGURE 9) during the measuring period, represents precisely the proportion of fibres whose length is greater than the length $l$ (more exactly: the "height" of which is greater).

In order to measure the proportions for certain preselected lengths, it is therefore sufficient to use a very simple mechanical system. The connection for displacing the carrier chassis 5 by a synchronous motor may be disconnected and replaced by a manual drive. The latter may be continuous, with an indicator system (graduated dial and revolution counter), enabling the position of the carriage to be read at each moment, that is to determine the length $l$. The proportion of fibres whose length exceeds $l$ is then read at the same time on the indicator voltmeter M1 (FIGURE 20) connected to the terminals 13 and 14 designated "OUT" (FIGURE 9).

(4.42) *Electric device.*—The mechancial system described hereinbefore is suitable only for the first method of measurement described below in section 5. The electrical device which will be described is applicable not only to the method of section 5 but is also applicable to the second method described in section 6, always provided, in the case of the second method, that the voltage $\Phi_a(l)$ mentioned hereinbefore is replaced by the voltage $B(x)$ obtained at the output of the device described in paragraph 8–2; it would thus be possible to store directly the voltage $\pi(x)$, but this type of diagram is not very familiar to woollen goods manufacturers (see hereinbelow).

Figure 19A:
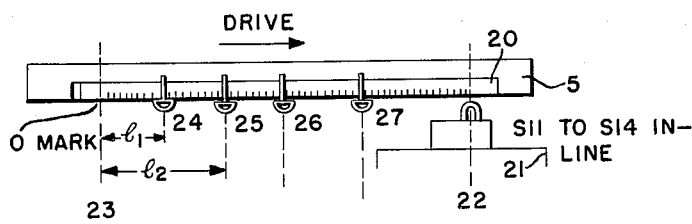
FIGURE 19A is a side view of the carrier frame which shows switching apparatus arranged to operate during the course of a measurement.
Figure 19C:
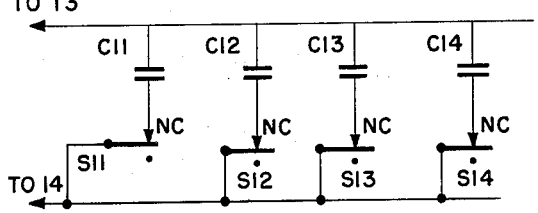
FIGURE 19C is a circuit diagram showing the electrical connections to the switches of FIGS. 19A and 19B.
Figure 19B:
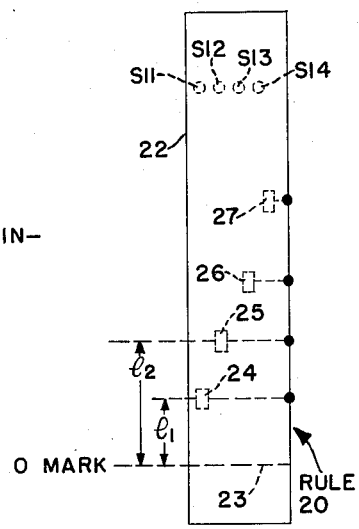
FIGURE 19B is a plan view showing the arrangement of the switch actuators and the switches of FIG. 19A.

The electrical device is constituted as follows: (see FIGURES 19A, 19B and 19C):

Four condensers C11 to C14 having high insulation (polystyrene, mylar, and so on) are connected to the output terminals 13 and 14 designated "OUT" in FIG. 9 through normally closed switches S11 to S14. The varying voltage $\Phi_a(l)$ which appears between the terminal 14 and ground during the period of measurement represents precisely the proportion of fibres whose length is greater than the length $l$ (more exactly: the "height"). This varying voltage therefore appears at all times at the terminals of the condensers C11 to C14. The switches S11 to S14 are in fact microswitches, fixed on the frame of the apparatus, beneath the U-shaped chassis driving the sample. A rule 20 graduated in millimetres is fixed to the U-shaped chassis. Four small actuators 24 to 27 are slidably mounted on this rule and may be fixed at preselected lengths $l_1$; $l_2$; $l_3$; $l_4$. Each of these four actuators individually causes the tripping of one of the microswitches S11 to S14, respectively, at distances $l_1 \ldots l_4$ measured from the base line to the centre of the measuring measurement electrodes 2a and 2a', that is to say at the time when the output signal between the terminal 14 of FIG. 9 and ground is respectively $\Phi_a(l_1) \ldots \Phi_a(l_4)$. The microswitch, on tripping, breaks the connection between terminal 14 and its associated condenser; the latter thus retains at its terminal a voltage corresponding to the proportion of fibres whose length is greater than the length $l$, chosen by fixing the corresponding actuator on the graduated rule 20.

When the measurement is completed, the two integrators are put into the position "HOLD," the operator reads the values $[a, l]$ and $[a, l_2]$ as usual from the indicator dials M2 and M3 of FIG. 20. One of the integrators is then returned to the position "RESET," that is to say returned to zero. The usual integration condenser is then disconnected, and the integrator is returned to the HOLD condition (see FIG. 10).

The condenser C11 is connected to the integrator at that moment instead of the usual integration condenser $Ca'$, that is to say between the input and output terminals 17 and 19, respectively of the D.C. amplifier A1.

The indicating voltmeter is connected between the output terminal 19 of the integrator and ground to indicate the proportion of fibres whose length is greater than $l_1$. More precisely, when using the first method of measurement the voltmeter reading indicates the proportion of fibres of which the "height" factor is greater than $l_1$ and in the second method of measurement the proportion determined with respect to the "beard" factor.

The condensers C2, C3, C4 are then connected in the circuit in the same way. (A condenser, not shown, of low value, 100 mmfd., remains permanently connected between the output and input terminals 19 and 17, respectively, of the D.C. amplifier.)

It should be mentioned that the D.C. amplifier constituting the integrator has another use. In fact for the prior zero adjustment (in the absence of material), the usual integration condenser is disconnected and replaced by a resistance (see FIGURE 11).

In this manner, the unbalance voltage is amplified and also read from the indicator dial M2 (FIG. 20), for example; this amplification facilitates the exact adjustment of the zero.

NOTE: The method of successive integrations on the voltage $\Phi_a(l)$ applied to the apparatus may be extended. Thus, a third integrator fed by the output of the second would furnish the moment of the third order of the distribution, enabling there to be obtained for example the coefficient of variation of the beard. This moment of the third order and the moments of higher orders would also enable the symmetry or asymmetry characteristics of the distribution to be stated.

(5) *Performance of a measurement by the first method*

The technique is as follows. A numerical sample of fibres is taken, by aligning their ends on a common line. This sampling may be effected from a material in which the fibres are already rendered parallel (combed sliver, for example) or from any material (even web or twist yarns of carded material) in which the fibres would be prepared or rendered parallel by combing.

The sample is deposited in the Teflon frame. Adjustment of the zero of the measuring device is then carried out by operating the condenser C8 (FIGURE 9). The alignment of the heads of the fibres (corresponding to voltage $\Phi_a(l)$ maximum) is then brought into the measuring condenser by manual operation of the driving device. The output voltage $\Phi_a(l)$ being read at this moment from a voltmeter, the maximum of $\Phi_a(l)$ is brought into register with a scale-end marking on the dial M1 (FIG. 20) by operation of the calibration knob (potentiometer R10, FIGURE 9).

At that moment, the carriage may be disengaged and operated manually in order to read from the voltmeter the proportions of fibres whose length exceeds some selected levels. (However, if the electric system with memory condensers is used, this prior operation is dispensed with; the proportions are read off from the indicator dial at the end of the measurement.)

The sample then being brought with the non-aligned ends of the fibres as far as the inlet of the measuring condenser, a knob is operated which initiates the driving by the synchronous motor and the placing of the integrators to the COMPUTE position. When the sample completes its passage through the condenser, the drive and the integrators stop automatically, and there are read off successively from 2 dials, M2 and M3, or from a single dial, by commutation, the values of mean "height" $[a, l]$, and $[a, l^2]$ the moment of the second order.

From this the "beard," and the coefficient variation of "height" are rapidly deduced from the Formulae 6 and 7. These two items of information are sufficient in practically all cases.

*Chapter 6. Second method of measurement*

The length apparatus described may be used according to another method, characterised by a different sampling.

The basic material on which the measurement is carried out is the combed sliver (or possibly a sufficient number of rovings disposed side by side).

The actual sample is a piece 25 cm. long approximately of combed sliver one end of which is squared by the "cut squaring" method of Daniels, or by a simplified alternative (see "Wool Science Review," No. 9, published by IWS. London).

The other end is simply cut with the scissors.

To sum up (see FIGURE 12), the "squaring" operation consists in extracting from the piece of sliver all the fibres whose left-hand end is situated on the left of the section A of the sliver.

The piece of sliver is first spread out, in order to obtain a sheet of parallel fibres which lie side by side and are not entangled nor twisted, and are reasonably straight.

The extraction is then carried out by taking all the necessary operating precautions in order not to disturb the order of the fibres remaining in the sliver. (It is possible for example to place the sliver on a sheet of velvet, or in a field of needles, and to cut them on the section B, at 5 mm. from A; then to extract with the utmost precaution all the fibres extending to the left of the section A. Still another method consists in carrying out successive samplings of fibres by means of a wide pair of tweezers, over a length of 2 or 3 mm. of the piece of sliver, passing from C as far as A.)

The equipment required for the measurement is identical to that used in the first method of measurement.

The sample of sliver prepared as above is deposited in the Teflon frame and driven through the measuring condenser (in the direction of the length of the fibres). Using the normal zero adjustment (output voltage zero corresponding to the absence of material in the frame), a diagram $\mathcal{F}(x)$ would be obtained similar to that shown in FIGURE 13. Assuming provisionally that all the fibres are of the same section, the output voltage $\mathcal{F}(x)$ will be expressed by:

$$\mathcal{F}(x) = \frac{1}{\bar{l}}\left\{x[1-F(x)] + \int_0^x l\,dF(l)\right\} \qquad (1)$$

where $x$ represents the abscissa, measured in the direction of the length of the fibres, from the section A taken as origin; $\mathcal{F}(l)$ is the distribution function of the length of the fibres (in numerical distribution):

$\bar{l}$ is the numerical mean length $(1/l)$.

In fact, $\mathcal{F}(x)$ is the reduced output voltage, i.e., related to the maximum output voltage corresponding to the section D, or else to the mean number of fibres in section $n_s$. $\mathcal{F}(x)$ therefore varies from 0 to 1; if we consider its complement to unity:

$$\pi(x) = 1 - \mathcal{F}(x) = \frac{1}{\bar{l}}\left\{\bar{l} - x[1-F(x)] - \int_0^x l\,dF(l)\right\} =$$
$$\frac{1}{\bar{l}}\left\{\int_x^\infty l\,dF(l) - \int_x^\infty l\,dF(l)\right\} \qquad (2)$$

we obtain the expression:

$$\pi(x) = \frac{1}{\bar{l}}\int_x^\infty (l-x)\,dF(l) \qquad (3)$$

$\pi(x)$ varies from 1 to 0 for $x$ varying from 0 to infinity, or from 0 to $x_D$ in practice.

The measuring apparatus will furnish this voltage $\pi(x)$ directly by means of a special zero adjustment consisting in making the zero of the output voltage correspond to the ordinate obtained at the point $x_D$, or better to the mean ordinate in the zone $x_D$ to $x_E$.

The voltage $\pi(x)$ furnished by the measuring apparatus is applied to a first integrator, functioning during the entire period of measurement, and which gives at the output a function:

$$Z(x) = \int_0^x \pi(x)\,dx \frac{1}{\bar{l}}\int_x^\infty dx \int_0^\infty (l-x)\,dF(l) \qquad (4)$$

At the end of measurement, the output voltage of the first integrator is equal to:

$$Z(x) \atop x\to\infty = \frac{1}{\bar{l}}\int_0^\infty dx \int_x^\infty (l-x)\,dF(l) = \frac{1}{\bar{l}}\int_0^\infty dF(l) \int_0^l (lx)\,dx =$$
$$\frac{1}{2\bar{l}}\int_0^\infty l^2\,dF(l) = \frac{1}{2}\frac{[1;\,l^2]}{[1;\,l]} = \frac{1}{2}[1;\,l] \qquad (5)$$

In fact, the fibres are not all of the same section, as supposed hereinbefore, and the measuring voltage $\pi(x)$ is proportional to the section $a$ of the fibre.

The output voltage of the 1st integrator at the end of measurement is therefore equal to ½ $[al;\,l]$; the output voltmeter (where the factor ½ is eliminated by calibration) therefore indicates the mean length proportionate to the section and to the length generally denoted by the term "beard."

The beard is consequently the length and cross-section area biased mean length, or weight biased mean length.

The output voltage $Z(x)$ of the first integrator is applied at each instant to the second integrator during the measuring period. At the end of the measurement, the output voltage of the second integrator furnishes the quantity $[al;\,l^2]$ which permits calculation of the beard variation coefficient $CV[al;\,l]$ by using the relationship:

$$[al;\,l^2] = [al;\,l]^2 \cdot \{1+CV^2[al;\,l]\} \qquad (6)$$

whence:

$$CV^2[al;\,l] = \frac{[al;\,l^2]}{[al;\,l]^2} - 1 \qquad (7)$$

To evaluate the output voltage of the second integrator it must be stated first of all that the sample of combed sliver passes through the measuring condenser beginning by the section D (see FIGURE 12). The passage of the line A (squared end of sliver) through the condenser at the end of the measurement automatically sets the two integrators to "HOLD," either by means of an electronic device using the abrupt drop in the measuring voltage at that moment or more simply by means of a microswitch fixed to the carriage.

The output voltage of the second integrator at the end of the measurement can be written as follows therefore:

$$\theta = \int_0^\infty du \int_u^\infty \pi(x)\,dx = \frac{1}{\bar{l}}\int_u^\infty du \int_u^\infty dx \int_x^\infty (l-x)\,dF(l) \qquad (8)$$

or else:

$$\theta = \frac{1}{\bar{l}}\int_u^\infty du \int_u^\infty dF(l)\int_u^l (l-x)\,dx =$$
$$\frac{1}{2\bar{l}}\int_0^\infty du \int_u^\infty \cdots (l-u)^2\,dF(l) =$$
$$\frac{1}{2\bar{l}}\int_0^\infty \frac{l^3}{3}dF(l)\int_0^l (l-u)^2\,du = \frac{1}{2\bar{l}}\int_0^\infty \frac{l^3}{3}dF(l)$$

whence finally:

$$\theta = \frac{1}{6\bar{l}}\cdot\overline{l^3} = \frac{1}{6}\frac{[1;\,l^3]}{[1;\,l]} = \frac{1}{6}[l;\,l^2] \qquad (9)$$

In addition to the beard $[al,\,l]$ and the beard variation coefficient, an identical system to that described in chapter 4.4. furnishes 4 or 5 points of the length diagram $\pi(x)$ defined by (3).

This type of diagram, however, is not very familiar to wool goods manufacturers; it is more difficult to interpret than the diagram obtained by the first method of measurement.

*Chapter 7. Extension of the system of measurement to other samples than the combed sliver*

The system of measurement can be extended to very varied materials.

The following will be cited particularly:
 (A) In worsted:
   (1) The rovings
   (2) Card web
   (3) Card sliver
 (B) In woolen:
   (4) The woolen card web
   (5) The twist yarn.

I. The rovings may be measured by the first or the second method of measurement. It is sufficient to assemble them side by side in a sufficient number to reconstitute practically the section of a combed sliver. However, the assembly thus formed is relatively fragile; it must be held in place after preparation of the sample. The Teflon sheet frame perfectly performs this task; on the other hand, a direct drive by corrugated rolls is practically impossible.

The same applies a fortiori for all other materials, even much more fragile, which are mentioned hereinbefore. (Card web, woolen card web, etc.)

II. The samples of card web, card sliver, woolen card web, twist yarn etc. are all characterised by a low degree of parallelism of the fibres. The first method of measurement only is applicable in this case, with a special method of operation for taking the sample.

The result of the measurement is a parameter which will be termed "useful length" and which has only a relative value. (The result is in fact influenced by the percentage of fibres folded over on themselves.)

It will not therefore be possible to compare directly the lengths except for one and the same material (woolen card web for example).

However, it seems possible to establish a correlation between the "useful" length of the fibres in two different materials for example, in carded wool, in the woolen card web and in the twist yarn.

In worsted, it would likewise be possible to establish a correlation between the real length (measured on combed sliver) and the "useful length" measured on card web.

This technique would permit estimation of the length on wool in flock by forming a sample card web with the aid of a small laboratory card. It would also be possible to use it on the shredded carded material.

It will be indicated hereinbelow the process of taking the sample for card web (other materials being treated in similar manner).

(a) A sample of card cloth of 30 cm. length is taken (in the preferential direction of the fibres) and from 4 to 5 cm. wide, over a thickness of about 2 cm. (obtained if necessary by superimposing a number of layers of web). This sample is clamped in its centre over a length of 1.5 cm. by means of two metal plates of 1.5 cm. x 10 cm. clamped by screws and butterfly nuts (see FIGURE 14). The two "beards" thus formed on either side of the clamp are then carefully combed, beginning with a large tooth comb and finishing with the fine comb.

(b) The two beards are then cut level with the clamp with a knife employing a razor blade, and superimposed so as to bring the two out edges one above the other. The measuring sample thus formed is inserted in the Teflon sheet frame, the alignment of the left-hand ends of the fibres (in combed sliver) corresponding here to the cut edge of the sample. The further process of measurement is identical to that described for the combed sliver (first method of measurement).

The sample taken by clamping from the cloth is not numerical: it may be considered as proportionate to the length. The output of the first integrator therefore gives the beard $[al; l]$ rather than the "height" $[a, l]$.

In fact, an absolute value is not obtained; the term "useful beard" will therefore be given to the parameter measured.

The method described hereinbefore is directly adapted from an entirely manual method of working proposed by Lewalle and Rousseau, in which the second phase (b) hereinbefore is replaced by weightings of successive sections of 5 mm. of the beards and by subsequent calculations.

*Chapter 8. Special versions of the apparatus*

The type apparatus is composed of the three parts described briefly at the beginning of Chapter 4. However, it is possible to add special devices extending the possibilities of the apparatus.

*(8.1) Obtaining of the beard diagram in the first method of measurement.*—In the first method of measurement, the output voltage of the electronic device associated with the measuring condenser furnishes a "height" diagram (length proportionate to the section). The system of memory condensers in fact permits the reading of four or five points of this diagram, corresponding to selected lengths. This "height" diagram is well known by woolen goods manufacturers. However, several laboratories systematically use the "beard" diagram.

It is possible to convert the "height" diagram to a "beard" diagram directly during measurement, using a process which will be justified hereinafter.

The bias as a result of the section $a$ as introduced by the measuring condenser will be disregarded in the calculation.

The "beard" diagram can then be defined by the relationship:

$$B(x) = \frac{1}{\bar{l}} \int_x^\infty l dF(l). \qquad (10)$$

or else $$B(x) = \frac{1}{\bar{l}} \left\{ -l[1-F(l)]_x^\infty + \int_x^\infty [1-F(l)\,dl] \right\}$$

and finally:

$$B(x) = \frac{1}{\bar{l}} \left\{ x[1-F(x)] + \int_x^\infty [1-F(l)]dl \right\} \qquad (11)$$

We saw that the height diagram was defined by:

$$\Phi(l) = 1 - F(l) \qquad (12)$$

Moreover, the sample of fibres passing through the condenser beginning by the non-aligned end, the output voltage of the first integrator (which furnishes the height $[a; l]$) at the end of measurement) is written:

$$\int_x^\infty [1-F(l)]dl$$

Hence to obtain a point of the beard diagram $B(x)$ for an abscissa $x$ (i.e. for a selected length $(l)$, it is sufficient to add to the output voltage of the first integrator for this abscissa $x$ the product of the abscissa $x$ by the ordinate $[1-F(x)]$ of the height for the abscissa $x$ (i.e., by the output voltage of the measuring device at that moment).

In practice, these operations are carried out in the following manner.

The progression movement of the carriage is transmitted to the axis of a linear potentiometer. The rotation of the latter is therefore proportional to the length $l$ or to the abscissa $x$. The slider is situated at the top of the potentiometer for the maximum length of the fibres (for example $x=25$ cm.) and at the bottom of the potentiometer for $x=0$.

At the terminals of this potentiometer is introduced the voltage $1-F(x)$ taken from the output of the measuring device; between the sliders and the lower terminal a voltage proportional to $x[1-F(x)]$ is obtained.

It remains to add this latter voltage to that taken from the output of the first integrator $$\int_x^\infty [1-F(l)]dl$$

This operation may be effected by a simple network of resistors, or better by means of an "adder" using a D.C. amplifier with feedback resistance (see FIG. 15).

(Note: the output voltage of the first integrator must undergo a reversal of the sign before the addition.)

Some points of the function $B(x)$ (beard diagram), may then be stored in the memory condensers (chap. 3). The values indicated must again be divided by the height $[a; l]$; it is sufficient simply to take for unity the value of $B(x)$ for $x=0$.

*(8.2) Obtaining of the "beard" diagram in the second method of measurement.*—Taking the expression of $\pi(x)$ again $$\pi(x) = 1 - \mathcal{F}(x) = \frac{1}{\bar{l}}\left[\bar{l} - x[1-F(x)] - \int_0^x l dF(l)\right] \qquad (13)$$

re-written in the form $$\pi(x) \frac{1}{\bar{l}}\left[\left[\int_0^\infty l dF(l) - \int^\infty l dF(l) - x[1-F(x)]\right]\right] = \frac{1}{\bar{l}}\left[\int_x^\infty l dF(l) - x[1-F(x)]\right]$$

we obtain $$B(x) = \frac{1}{\bar{l}} \int_x^\infty l dF(l) = \pi(x) + \frac{1}{\bar{l}} x[1-F(x)] \qquad (14)$$

Now the derivative of $\pi(x)$ is written:

$$\pi'(x) = -\frac{1}{\bar{l}}[1-F(x)] \qquad (15)$$

In practice, the beard diagram is obtained in the following manner. The voltage $\pi(x)$ issuing from the measuring device is applied to a "parallel-feedback" differentiator using a D.C. amplifier. The output voltage of the differentiator $$\pi'(x) = \frac{1}{\bar{l}}[1-F(x)]$$

is fed between the end terminals of a potentiometer the axis of which is driven by the carriage (same system as in 8.1). Between the slider and the terminal at the bottom is taken off a voltage $$\frac{1}{\bar{l}} \cdot x[1-F(x)]$$

which only has to be added to the measurement voltage $\pi(x)$ (either on a network of resistance or by a "parallel-feedback" "adder" containing a D.C. amplifier, to obtain the diagram of $B(x)$.

(8.3) *Automatic sampling.*—In the second method of measurement, the sample is the combed sliver itself, which has been spread out eventually and one end of which has been squared by the technique described in Chapter 6. In the first method the sample is constituted by one or more successive samplings (extractions) of fibers from this squared end, which samplings are effected by means of a flat clamp with wide edges, over a length of 4 mm. of band for example.

In both cases, manual sampling of the sample and the deposition of the squared end (or of the alignment of the fibres) in coincidence with the marking of the frame, must be performed with great care. An automatic mechanical system imitating the manual operations facilitates sampling operations and makes the results uniform.

Figure 16:
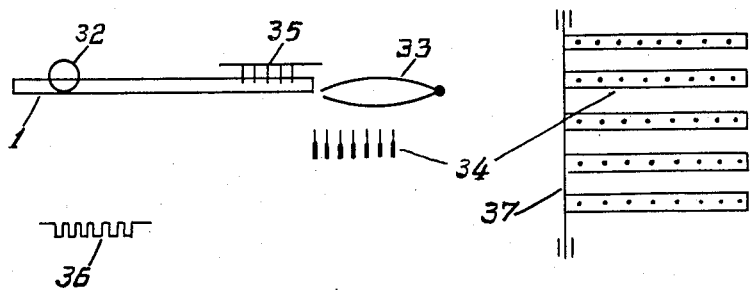
FIGURE 16 is a diagrammatic view of automatic sampling apparatus.

This system is made up as follows (see FIGURE 16). The combed sliver is deposited in a U-shaped channel 31 about 30 cm. long; a grooved roll 32 drives the sliver, by 4 mm. steps, between each clamping. The automatic clamp 33 deposits the sampled fibres in a field of needles 34 disposed immediately beneath the clamp. When each clamp sampling is effected, the sliver is held in a field of needles 35 which rises during the progression movement of the sliver. The first samplings over a length of some centimetres of the sliver (of the order of the maximum length of the fibres) are eliminated to ensure the squaring. The rest of sliver thus obtained is used directly as sample in the 2nd method of measurement. For the 1st method, some superimposed samplings are still deposited in the field of needles 34, each sampling being pressed well home at the bottom of the field of needles by means of a special clamp 36. The field of needles 34 then returns about a hinge 37 and comes to lie above the Teflon sheet frame, open and held in place. A part of a shape similar to 36 then causes the sample of fibres to leave the field of needles 34 to deposit it in the frame, with the alignment of the fibres in register on reference marks. The frame is then closed, after withdrawal of the field of needles.

What I claim is:

1. The method of measuring length distribution in a sample of generally straight fibers which comprises the steps of: arranging all of the individual fibers in said sample side by side substantially in a plane with one end of each of the fibers disposed on a common straight base line and with each fiber extending substantially perpendicularly with respect to said line, generating an electrostatic field directed perpendicularly with respect to said plane, the cross-sectional area of said field being elongated in a direction parallel to said line, said area having a width which is sufficiently narrow with respect to the average fiber length to be effectively zero, the length of said cross-sectional area being greater than the width of the sample, said field extending between two spaced electrodes, passing said sample progressively through said field and between said electrodes while maintaining said line parallel to the length of said cross-sectional area and said plane perpendicular to the direction of said field; measuring the capacitance between said electrodes during the passage of said sample therebetween; and utilizing variations in said capacitance produced by the dielectric constant of the fibers in said sample during said passage thereof between said electrodes for evaluating the length distribution in said sample.

2. The method according to claim 1, wherein said sample is passed between said electrodes at constant velocity, and in which the time integrated instantaneous value of said capacitance above a predetermined reference value at predetermined points along said sample is utilized in evaluating said length distribution.

3. The method according to claim 1, comprising the further step of producing a measurement potential which is directly proportional to the amount by which said instantaneous value of said capacitance exceeds a reference value measured without said fibers and utilizing the time-integrated magnitude of said measurement potential for evaluating said length distribution.

4. Apparatus for determining the length distribution of generally straight fibers within a sample, said apparatus comprising: supporting means carrying said fibers arranged side by side in a plane with one end of each of the fibers disposed on a common straight base line and with each fiber extending substantially perpendicularly with respect to said base line; displacement means connected to said supporting means, said displacement means being adapted to produce rectilinear movement of said supporting means along a second line lying in said plane and perpendicular to said base line; two confronting spaced electrodes disposed on opposite sides of said plane, said electrodes being positioned for passage of said sample therebetween during said movement of said supporting means by said displacement means, said electrodes being shaped to produce an electrostatic field therebetween which extends perpendicularly with respect to said plane, the cross-sectional area of said field being elongated in a direction parallel to said base line, the length of said area being greater than the width of said sample and the width of said area being sufficiently narrow with respect to the average fiber length to be effectively zero; and measurement means connected to said electrodes for measuring the instantaneous value of the capacitance between said electrodes during said passage of said sample therebetween.

5. Apparatus for determining the length distribution of generally straight fibers within a sample, said apparatus comprising: two confronting sheets of dielectric material the dielectric constant of which is low with respect to the dielectric constant of said fibers; supporting means for maintaining said sheets under tension whereby they are held flat, said sheets holding said sample therebetween with the individual fibers thereof lying side by side and with one end of each fiber disposed on a common straight base line, all of said fibers being held in a common plane between said sheets with each fiber extending perpendicularly with respect to said line; displacement means acting on said supporting means, said displacement means being adapted to produce rectilinear movement of said supporting means along a second line lying in said plane and perpendicular to said base line; two cooperating spaced electrodes disposed on opposite sides of said plane, said electrodes being positioned for passage of said sample therebetween during said movement of said supporting means by said displacement means, said electrodes being shaped to produce an electrostatic field therebetween which extends perpendicularly with respect to said plane, the cross-sectional area of said field being elongated in a direction parallel to said base line, the length of said area being greater than the width of said sample and the width of said area being sufficiently narrow with respect to the average fiber length to be effectively zero; and measurement means connected to said electrodes for evaluating the instantaneous value of the capacitance between said electrodes during said passage of said sample therebetween.

6. Apparatus for determining the length distribution of generally straight fibers within a sample, said apparatus comprising: supporting means supporting all of the fibers of said sample with said fibers arranged side by side in a plane and with one end of each of the fibers disposed on a common straight base line, each fiber extending substantially perpendicularly in the same direction away from said line; constant speed displacement means acting on said supporting means, said displacement means being adapted to produce rectilinear move-
ment of said supporting means along a second line lying in said plane and perpendicular to said common line; two cooperating spaced electrodes disposed on opposite sides of said plane, said electrodes being positioned for the passage of said sample therebetween during said movement of said supporting means by said displacement means, said electrodes being shaped to produce an electrostatic field therebetween which extends perpendicularly with respect to said plane, the cross-sectional area of said field being elongated in a direction parallel to said base line, the length of said area being greater than the width of said sample and the width of said area being sufficiently narrow with respect to the average fiber length to be effectively zero; and measurement means connected to said electrodes for evaluating the instantaneous value of the capacitance between said electrodes during said passage of said sample therebetween.

7. Apparatus for determining the length distribution of generally straight fibers within a sample, said apparatus comprising: two confronting sheets of dielectric material the dielectric constant of which is low with respect to the dielectric constant of said fibers; supporting means for maintaining said sheets under tension whereby they are held flat, said sheets holding all of the fibers of said sample therebetween with the individual fibers thereof lying side by side and with one end of each fiber disposed on a common straight base line, all of said fibers being held in a common plane between said sheets with each fiber extending perpendicularly with respect to said base line; displacement means connected to said supporting means, said displacement means being adapted to produce rectilinear movement of said supporting means along a second line lying in said plane and perpendicular to said base line; two spaced electrodes disposed on opposite sides of said plane, said electrodes being arranged to permit passage intermediate said electrodes of said sheets with said sample held therebetween during said movement of said supporting means by said displacement means, said electrodes being shaped to produce an electrostatic field therebetween oriented perpendicularly with respect to said plane, the cross-sectional area of said field being elongated in a direction parallel to said base line, the length of said area being greater than the width of said sample and the width of said area being sufficiently narrow with respect to the average fiber length to be effectively zero; a source of high frequency current connected to energize said electrodes for producing said electrostatic field; evaluating means connected to said electrodes and resposnive to any instantaneous incremental change in the value of the capacitance therebetween with respect to a reference value of said capacitance determined during the presence of said sheets between said electrodes without said sample; and detecting means included in said evaluating means, said detecting means producing a varying unidirectional measurement potential the instantaneous magnitude of which is proportional to said incremental change in capacitance.

8. Apparatus for determining the length distribution of generally straight fibers within a sample, said apparatus comprising: two confronting sheets of dielectric material the dielectric constant of which is low with respect to the dielectric constant of said fibers; supporting means including frame means for maintaining said sheets under tension whereby they are normally held flat and in contact with each other, said sheets holding the individual fibers of said sample therebetween in side by side relationship with one end of each fiber disposed on a common straight base line, all of said fibers being held in a common plane between said sheets with each fiber extending perpendicularly with respect to said base line; constant speed displacement means connected to said supporting means, said displacement means being adapted to produce rectilinear movement of said supporting means along a second line lying in said plane and perpendicular to said base line; two spaced measurement electrodes disposed on opposite sides of said plane, said electrodes being positioned for passage of said frame means therebetween during said movement of said supporting means by said displacement means, said electrodes being shaped to produce an electrostatic field therebetween oriented perpendicularly with respect to said plane, the cross-sectional area of said field being elongated in a direction parallel to said base line, the length of said area being greater than the width of said sample and the width of said area being sufficiently narrow with respect to the average fiber length to be effectively zero; a source of current of constant high frequency; at least one resonant circuit energized by said source, said electrodes being connected to said resonant circuit to alter the frequency of resonance thereof in response to changes in the capacitance therebetween; detecting means responsive to current flow in said resonant circuit, said detecting means producing a varying unidirectional measurement potential the instantaneous magnitude of which is proportional to the magnitude of variations in the capacitance between said electrodes with respect to a reference value determined by the presence between said electrodes of said sheets without said sample; calibrating means included in said detecting means for adjusting the magnitude of said measurement potential to zero for said reference value of said capacitance; at least one integrator connected to said detecting means for evaluating the time integral of said measurement potential during the passage of said sample between said electrodes; and indicating means connected to said integrator for indicating the magnitude of said time integral.

9. Apparatus according to claim 8, further comprising a second resonant circuit included in said detecting means, said second resonant circuit being similar in all respects to said one resonant circuit, said second resonant circuit being connected for energization from said source along with said one resonant circuit, said calibrating means being an adjustable capacitor connected to said second resonant circuit to alter the frequency of resonance thereof, said detecting means being responsive to the difference between the magnitudes of the currents flowing in said resonant circuits.

10. Apparatus according to claim 9, wherein the resonant frequencies of said resonant circuits differ from the frequency of said source by an amount sufficient to cause said detecting means to respond to the magnitudes of currents flowing for linear portions of the resonance curves of said resonant circuits.

11. Apparatus according to claim 8, further comprising a second integrator connected to the output of said one integrator for evaluating the time integral of said first-named time integral, and further indicating means connected to said second integrator for indicating the time integral evaluated by said second integrator.

12. Apparatus according to claim 8, further comprising indicating means connected to said detector for indicating the magnitude of said measurement potential.

13. Apparatus according to claim 4, wherein said supporting means is arranged for limited reciprocatory movement along said second line, said displacement means causing unidirectional movement of said supporting means within the limits of said reciprocatory movement.

14. The method according to claim 1, further comprising the preliminary steps of squarely cutting an elongated bundle of fibers transversely so that the adjacent ends of the cut fibers all lie in a common transverse plane, and removing from said bundle all of the fibers the ends of which lie between said common plane and a second plane parallel to said common plane and spaced therefrom by a predetermined distance, said removed fibers constituting the fibers of said sample.

15. The method of measuring length distribution in an elongated bundle of generally straight fibers which comprises the steps of: squarely cutting said bundle so that the cut ends of the fibers at one end of said bundle all lie in a common transverse plane; removing from said bundle all of the fibers the ends of which lie between said common plane and a second plane extending parallel to and spaced by a predetermined distance from said common plane; arranging the remaining fibers of the bundle individually in side by side relationship substantially in a plane while retaining the longitudinal position of each fiber relative to the other remaining fibers substantially unchanged to form a test sample; generating an electrostatic field oriented perpendicularly with respect to the plane of said test sample, the cross-sectional area of said field being elongated in a direction perpendicular to the fibers of said sample, said area having a width which is sufficiently narrow with respect to the average fiber length to be effectively zero, the length of said cross-sectional area being greater than the width of said sample, said field extending between two spaced electrodes; passing said sample progressively between said electrodes and through said field commencing with said cut ends of the fibers thereof; measuring the capacitance between said electrodes during the course of said passing step; and utilizing variations in said capacitance produced by the dielectric constant of said fibers during said passing step for evaluating the length distribution of the fibers making up said bundle.

References Cited by the Examiner

UNITED STATES PATENTS

| | | | |
|---|---|---|---|
| 2,457,727 | 12/1948 | Riffenberg | 324—61 X |
| 2,576,772 | 11/1951 | Bernet et al. | 324—61 |
| 2,898,550 | 8/1959 | Fischer | 324—61 |
| 2,950,436 | 8/1960 | Butticaz et al. | 324—61 |

WALTER L. CARLSON, *Primary Examiner.*

SAMUEL BERNSTEIN, *Examiner.*